United States Patent
Matsunobu et al.

(10) Patent No.: US 12,024,610 B2
(45) Date of Patent: Jul. 2, 2024

(54) METHOD OF PRODUCING POROUS BODY

(71) Applicant: TOYOTA JIDOSHA KABUSHIKI KAISHA, Toyota (JP)

(72) Inventors: Kohei Matsunobu, Toyota (JP); Akio Minakuchi, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 366 days.

(21) Appl. No.: 17/066,063

(22) Filed: Oct. 8, 2020

(65) Prior Publication Data
US 2021/0108043 A1 Apr. 15, 2021

(30) Foreign Application Priority Data
Oct. 9, 2019 (JP) .................. 2019-185721

(51) Int. Cl.
*C08J 9/28* (2006.01)
*C08F 14/22* (2006.01)
(Continued)

(52) U.S. Cl.
CPC ............ *C08J 9/28* (2013.01); *C08F 14/22* (2013.01); *C08F 214/182* (2013.01); *C08L 1/12* (2013.01);
(Continued)

(58) Field of Classification Search
CPC .................. C08J 9/28; C08J 2201/0504; C08J 2300/102; C08J 2301/12; C08J 2327/16;
(Continued)

(56) References Cited

U.S. PATENT DOCUMENTS

| 3,450,650 A | 6/1969 | Murata |
| 5,238,636 A | 8/1993 | Furukawa et al. |
| (Continued) |

FOREIGN PATENT DOCUMENTS

| CN | 102487137 A | 6/2012 |
| CN | 103981633 A | 8/2014 |
| (Continued) |

OTHER PUBLICATIONS

Translation of KR 20150045786 by Hong et al. (Year: 2015).*
(Continued)

*Primary Examiner* — Michael M Dollinger
*Assistant Examiner* — Christina H. W. Rosebach
(74) *Attorney, Agent, or Firm* — Sughrue Mion, PLLC

(57) ABSTRACT

Provided is a method of producing a porous body of a water-insoluble polymer, the method being excellent in terms of simplicity and capable of suppressing formation of a skin layer. A method of producing a porous body of a water-insoluble polymer disclosed here includes the steps of: preparing a solution in which a water-insoluble polymer is dissolved in a mixed solvent containing a good solvent for the water-insoluble polymer and a poor solvent for the water-insoluble polymer; coating the solution on a substrate; coating a slurry containing insulating particles, a binder and a dispersion medium on the coated solution; and simultaneously drying the coated solution and the slurry to porosify the water-insoluble polymer. The poor solvent has a boiling point higher than a boiling point of the good solvent. The dispersion medium can dissolve the water-insoluble polymer.

2 Claims, 3 Drawing Sheets

(51) Int. Cl.
  *C08F 214/18* (2006.01)
  *C08L 1/12* (2006.01)
  *H01M 50/451* (2021.01)

(52) U.S. Cl.
  CPC ... *H01M 50/451* (2021.01); *C08J 2201/0504* (2013.01); *C08J 2300/102* (2013.01); *C08J 2301/12* (2013.01); *C08J 2327/16* (2013.01)

(58) Field of Classification Search
  CPC ........ C08F 14/22; C08F 214/182; C08L 1/12; H01M 50/451; B32B 27/306; B32B 27/24; B32B 27/08; B32B 19/045; B01D 67/0009–00113; B01D 67/0023
  See application file for complete search history.

(56) References Cited

U.S. PATENT DOCUMENTS

| | | | |
|---|---|---|---|
| 6,177,181 | B1 | 1/2001 | Hamada et al. |
| 6,464,351 | B1 | 10/2002 | Laundry-Coltrain et al. |
| 8,183,337 | B1 | 5/2012 | Pacetti |
| 11,434,343 | B2 | 9/2022 | Matsunobu et al. |
| 11,652,259 | B2 | 5/2023 | Matsunobu et al. |
| 2005/0186479 | A1 | 8/2005 | Totsuka et al. |
| 2006/0148911 | A1 | 7/2006 | Mattingley et al. |
| 2007/0036959 | A1 | 2/2007 | Yamato et al. |
| 2012/0141877 | A1 | 6/2012 | Choi et al. |
| 2013/0058858 | A1 | 3/2013 | Uyama et al. |
| 2013/0287937 | A1* | 10/2013 | Joo .................. B01D 67/0046 427/126.3 |
| 2014/0311984 | A1 | 10/2014 | Nakama et al. |
| 2015/0122400 | A1* | 5/2015 | Mizuno .................. B32B 27/32 156/77 |
| 2016/0104900 | A1 | 4/2016 | Imashiro et al. |
| 2018/0251627 | A1 | 9/2018 | Schmitt |
| 2019/0367699 | A1 | 12/2019 | Minakuchi et al. |
| 2021/0061969 | A1 | 3/2021 | Matsunobu et al. |
| 2021/0061970 | A1 | 3/2021 | Matsunobu et al. |
| 2021/0108043 | A1 | 4/2021 | Matsunobu et al. |
| 2021/0280942 | A1 | 9/2021 | Matsunobu et al. |

FOREIGN PATENT DOCUMENTS

| | | | |
|---|---|---|---|
| EP | 3 786 222 | A1 | 3/2021 |
| EP | 3 786 223 | A1 | 3/2021 |
| EP | 3 805 298 | A1 | 4/2021 |
| EP | 3 851 188 | A1 | 7/2021 |
| FR | 3 041 352 | A1 | 3/2017 |
| JP | 4-48507 | A | 2/1992 |
| JP | 10-278417 | A | 10/1998 |
| JP | 2000-296668 | A | 10/2000 |
| JP | 2001-88432 | A | 4/2001 |
| JP | 2001-270946 | A | 10/2001 |
| JP | 2005-213315 | A | 8/2005 |
| JP | 2005-533884 | A | 11/2005 |
| JP | 2006-306945 | A | 11/2006 |
| JP | 2008-056905 | A | 3/2008 |
| JP | 2011-165574 | A | 8/2011 |
| JP | 2011-236292 | A | 11/2011 |
| JP | 2019-206667 | A | 12/2019 |
| KR | 10-2006-0042119 | A | 5/2006 |
| KR | 10-2006-0116323 | A | 11/2006 |
| KR | 10-1198806 | B1 | 11/2012 |
| KR | 10-1872094 | B1 | 7/2018 |
| WO | 89/08679 | A1 | 9/1989 |
| WO | WO-0189673 | A2 * | 11/2001 ......... B01D 67/0009 |
| WO | 2008/130705 | A1 | 10/2008 |
| WO | 2011/138937 | A1 | 11/2011 |
| WO | 2014/199880 | A1 | 12/2014 |

OTHER PUBLICATIONS

Translation of JP 2012069457 by Miyoshi. (Year: 2012).*
U.S. Appl. No. 16/998,664, filed Aug. 20, 2020, Kohei Matsunobu et al.
U.S. Appl. No. 17/001,753, filed Aug. 25, 2020, Kohei Matsunobu et al.
Office Action dated Jul. 19, 2023 issued by the United States Patent and Trademark Office in U.S. Appl. No. 16/998,664.
Young, T.-H., et al., "Preparation of EVAL membranes with smooth and particulate morphologies for neuronal culture", Biomaterials, 2001, vol. 22, No. 13, pp. 1771-1777 (7 pages total).
Wang, G., "Fabrication of Poly(ethylene-co-vinyl alcohol) Monoliths via Thermally Induced Phase Separation and Their Applications", Osaka University Knowledge Archive, Jul. 31, 2015 (Jul. 31, 2015), XP055761556, DOI: 10.18910/54010.
Bai, Q., et al., "Hierarchical porous cellulose/activated carbon composite monolith for efficient adsorption of dyes", Cellulose, Springer Netherlands, Netherlands, vol. 24, No. 10, Jul. 29, 2017 (Jul. 29, 2017), pp. 4275-4289, XP036319834 (15 pages total).
Sun, Z., et al., "The role of pre-evaporation in the preparation process of EVOH ultrafiltration membranes via TIPS", Journal of Membrane Science, No. 563, Jun. 4, 2018, pp. 238-246 (9 pages total).
"Substance Detail- CAS Registry No. 96-48-0" by SciFinder (Year: 2023), 2 pages.
Lebo, R., "Properties of Mixtures of Isopropyl Alcohol and Water.", J. Am. Chem. Soc., Feb. 16, 1921, vol. 43, No. 5, pp. 1005-1011 (7 p. total).
Office Action issued Jan. 2, 2024 in U.S. Appl. No. 16/998,664.

* cited by examiner

METHOD OF PRODUCING POROUS BODY

BACKGROUND OF THE INVENTION

1. Field of the Invention

The present disclosure relates to a method of producing a porous body. The present application claims priority to Japanese Patent Application No. 2019-185721 filed on Oct. 9, 2019, the entire contents of which are incorporated herein by reference.

2. Description of the Related Art

Porous bodies of water-insoluble polymers can exhibit a variety of characteristics, such as lightness, shock-absorbing properties, thermal insulation properties, sound absorption properties, separation properties and adsorption properties. Therefore, porous bodies of water-insoluble polymers have been used in a wide variety of applications, such as packing materials, construction materials, sound-absorbing materials, cleaning articles, cosmetic products, separation membranes, adsorbent materials, carriers for purification, catalyst carriers and culture carriers.

From perspectives such as production costs, it is desired for a method of producing a porous body of a water-insoluble polymer to be simple. As a method capable of producing a porous body of poly(vinylidene fluoride), which is a water-insoluble polymer, in a simple manner, Japanese Patent Application Publication No. 2011-236292 discloses a method f producing a porous body of poly(vinylidene fluoride), which includes preparing a solution by dissolving poly(vinylidene fluoride) in a mixed solvent of a good solvent for the poly(vinylidene fluoride) and a poor solvent for the poly(vinylidene fluoride) while heating, cooling the solution to obtain a molded body, immersing the molded body in another solvent to replace the mixed solvent with the another solvent, and then removing the another solvent by drying.

SUMMARY OF THE INVENTION

As a result of diligent research, the inventors of the present disclosure have found that the production method of the prior art had further room for improvement in terms of producing a porous body in a simple manner. In addition, the inventors of the present disclosure have found that a skin layer (skinning layer) having no pores was formed on the surface of the porous body. In cases where a skin layer is present on the porous body, a fluid cannot infiltrate into the porous body, which leads to drawbacks such as applications of the porous body being limited.

Therefore, an object of the present disclosure is to provide a method of producing a porous body of a water-insoluble polymer, the method being excellent in terms of simplicity and capable of suppressing formation of a skin layer.

A method of producing a porous body of a water-insoluble polymer disclosed here includes the steps of: preparing a solution in which a water-insoluble polymer is dissolved in a mixed solvent containing a good solvent for the water-insoluble polymer and a poor solvent for the water-insoluble polymer; coating the solution on a substrate; coating a slurry containing insulating particles, a binder and a dispersion medium on the coated solution; and simultaneously drying the coated solution and the slurry to porosify the water-insoluble polymer. The poor solvent has a boiling point higher than a boiling point of the good solvent. The dispersion medium is capable of dissolving the water-insoluble polymer.

Provided by such a configuration is a method of producing a porous body of a water-insoluble polymer, the method being excellent in terms of simplicity and capable of suppressing formation of a skin layer.

In a desired aspect of the method of producing a porous body of a water-insoluble polymer disclosed here, the dispersion medium of the slurry contains the good solvent and poor solvent contained in the solution.

According to such a configuration, a coating film of the slurry can be formed more uniformly on a coating film of the water-insoluble polymer solution.

DESCRIPTION OF THE PREFERRED EMBODIMENTS

Figure 1:
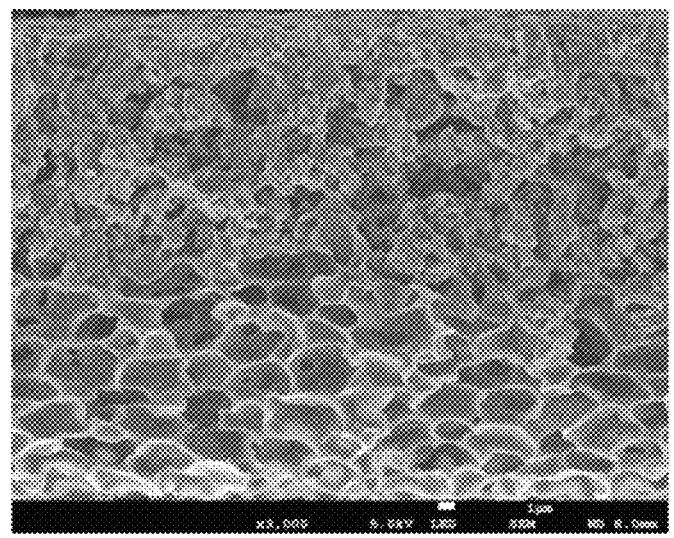
FIG. 1 is a SEM photograph of a cross section of a thin film obtained in Example 1.

A method of producing a porous body of a water-insoluble polymer of the present disclosure includes the steps of: preparing a solution in which a water-insoluble polymer is dissolved in a mixed solvent containing a good solvent for the water-insoluble polymer and a poor solvent for the water-insoluble polymer (hereinafter referred to as a "solution preparation step"); coating the solution on a substrate (hereinafter referred to as a "solution coating step"); coating a slurry containing insulating particles, a binder and a dispersion medium on the coated solution (hereinafter referred to as a "slurry coating step"); and simultaneously drying the coated solution and the slurry to porosify the water-insoluble polymer (hereinafter referred to as a "simultaneous drying step"). Here, the poor solvent has a boiling point higher than a boiling point of the good solvent. The dispersion medium can dissolve the water-insoluble polymer.

First, an explanation will be given of the solution preparation step. In the present disclosure, the "good solvent for the water-insoluble polymer" is a solvent in which the solubility of the water-insoluble polymer at 25° C. is 1 mass % or more. The solubility of the water-insoluble polymer in the good solvent at 25° C. is desirably 2.5 mass % or more, more desirably 5 mass % or more, further desirably 7.5 mass % or more, and most desirably 10 mass % or more. It should be noted that the type of good solvent to be used in the present disclosure is selected, as appropriate, according to the type of water-insoluble polymer. It is possible to use a single good solvent in isolation or a mixed solvent obtained by mixing two or more types of solvents.

In the present disclosure, the "poor solvent for the water-insoluble polymer" is a solvent in which the solubility of the water-insoluble polymer at 25° C. is less than 1 mass %. The solubility of the water-insoluble polymer in the poor solvent at 25° C. is desirably 0.5 mass % or less, more desirably 0.2 mass % or less, further desirably 0.1 mass % or less, and most desirably 0.05 mass % or less. The type of poor solvent to be used in the present disclosure is selected, as appropriate, according to the type of water-insoluble polymer. It is possible to use a single poor solvent in isolation or a mixed solvent obtained by mixing two or more types of solvents.

It is possible to use a Hansen solubility parameter (HSP) in order to assess whether a specific solvent is a good solvent or a poor solvent for a specific polymer compound. For example, if the dispersion term, polarity term and hydrogen bonding term of the HSP of the polymer compound are denoted by $\delta_{D1}$, $\delta_{P1}$ and $\delta_{H1}$ respectively and the dispersion term, polarity term and hydrogen bonding term of the HSP of the solvent are denoted by $\delta_{D2}$, $\delta_{P2}$ and $\delta_{H2}$ respectively, the solubility of the polymer compound tends to increase as the distance Ra ($MPa^{1/2}$) between the HSP of the polymer compound and that of the solvent, as represented by the formula below, decreases.

$$Ra^2=4(\delta_{D1}-\delta_{D2})^2+(\delta_{P1}-\delta_{P2})^2+(\delta_{H1}-\delta_{H2})^2$$

In addition, if the interaction radius of the specific polymer compound is denoted by $R_0$, it is predicted that the polymer compound will be soluble if the ratio $Ra/R_0$ is less than 1, partially soluble if the ratio $Ra/R_0$ is 0, and insoluble if the ratio $Ra/R_0$ is greater than 1.

Alternatively, it is possible to easily assess whether a specific solvent is a good solvent or a poor solvent for a specific polymer compound by carrying out a test involving mixing the polymer compound and the solvent in a sample bottle or the like.

The good solvent and the poor solvent are mixed and used as a homogeneous solvent. Therefore, the good solvent and the poor solvent are compatible with each other. In the present disclosure, the boiling point of the poor solvent being used is higher than the boiling point of the good solvent being used. From the perspective of enabling a homogeneous porous body having a relatively high porosity to be obtained easily, the boiling point of the poor solvent is desirably at least 10° C. higher, and more desirably at least 90° C. higher, than the boiling point of the good solvent. From the perspective of drying speed, the boiling point of the poor solvent is desirably lower than about 300° C.

In the present disclosure, the term "water-insoluble polymer" means a polymer that has a solubility in water of less than 1 mass % at 25° C. The solubility of the water-insoluble polymer in water at 25° C. is desirably 0.5 mass % or less, more desirably 0.2 mass % or less, and further desirably 0.1 mass % or less.

The "water-insoluble polymer" used in the solution preparation step is the same as the water-insoluble polymer that constitutes the porous molded body. A polymer for which a good solvent and a poor solvent exist is used as the water-insoluble polymer. The type of water-insoluble polymer to be used is not particularly limited as long as a good solvent and a poor solvent for the polymer exist. Examples of water-insoluble polymers include olefin-based resins such as polyethylene and polypropylene; fluorine-based resins such as poly(vinyl fluoride) and poly(vinylidene fluoride); (meth) acrylic-based resins such as poly(methyl (meth)acrylate) and poly(ethyl (meth)acrylate); styrene-based resins such as polystyrene, styrene-acrylonitrile copolymers and acrylonitrile-butadiene-styrene copolymers; water-insoluble cellulose derivatives such as ethyl cellulose, cellulose acetate and cellulose propionate; vinyl chloride-based resins such as poly(vinyl chloride) and ethylene-vinyl chloride copolymers; and ethylene-vinyl alcohol copolymers. It is possible to use a polymer that has been rendered water-insoluble through modification of a water-soluble polymer. Of these, the water-insoluble polymer is desirably an aliphatic polymer compound (that is, a polymer compound having no aromatic ring) from the perspectives of usability of a porous body of the water-insoluble polymer and usability of a simple method of producing same. From the perspective of enabling a homogeneous porous body having a relatively high porosity to be obtained easily, the water-insoluble polymer is desirably an addition polymerization type polymer compound (that is, a polymer compound produced by polymerization of an ethylenically unsaturated double bond in a monomer having the ethylenically unsaturated double bond; for example, a vinyl-based polymer or vinylidene-based polymer). The water-insoluble polymer is desirably an ethylene-vinyl alcohol copolymer from the perspectives of usability of a porous body having a three-dimensional network type porous structure and usability of a simple method of producing same.

The average degree of polymerization of the water-insoluble polymer is not particularly limited, but is desirably not less than 70 but not more than 500,000, and more desirably not less than 100 but not more than 200,000. It should be noted that the average degree of polymerization of the water-insoluble polymer can be determined using a publicly known method (for example, NMR measurements or the like).

Suitable good solvents and suitable poor solvents will now be explained in more detail using specific water-insoluble polymers as examples. The production method of the present disclosure can be advantageously carried out by using the good solvents and poor solvents explained below with the water-insoluble polymers given below.

1. Case Where Water-insoluble Polymer is Ethylene-vinyl Alcohol Copolymer

An ethylene-vinyl alcohol copolymer (EVOH) is a copolymer containing ethylene units and vinyl alcohol units as monomer units. The content of ethylene units in the EVOH is not particularly limited, but is desirably 10 mol % or more, more desirably 15 mol % or more, further desirably 20 mol % or more, and particularly desirably 25 mol % or more. On the other hand, the content of ethylene units in the EVOH is desirably 60 mol % or less, more desirably 50 mol % or less, and further desirably 45 mol % or less. The degree of saponification of the EVOH is not particularly limited, but is desirably 80 mol % or more, more desirably 90 mol % or more, and further desirably 95 mol % or more. The upper limit for the degree of saponification is determined by technical limitations relating to saponification and is, for example, 99.99 mol %. It should be noted that the content of ethylene units and the degree of saponification in the EVOH can be determined using a publicly known method (for example, $^1$H-NMR measurements or the like).

In addition, EVOHs are generally produced by saponifying copolymers of ethylene and vinyl esters using an alkali catalyst or the like. As a result, EVOHs can contain vinyl ester units. Vinyl esters in such units are typically vinyl acetate, and may also be vinyl formate, vinyl propionate, vinyl valerate, vinyl caprate, vinyl laurate, and the like. In addition to ethylene units, vinyl alcohol units and vinyl ester units, the EVOH may also contain other monomer units as long as the advantageous effect of the present disclosure is not significantly impaired.

Examples of suitable good solvents for the EVOH include dimethyl sulfoxide (DMSO) and mixed solvents of water and alcohols. The alcohol used in the mixed solvent is desirably propyl alcohol. The propyl alcohol may be n-propyl alcohol or isopropyl alcohol. Therefore, a particularly suitable good solvent is DMSO or a mixed solvent of water and propyl alcohol.

Examples of suitable poor solvents for the EVOH include water, alcohols, cyclic esters such as γ-butyrolactone; cyclic carbonates such as propylene carbonate; cyclic sulfones such as sulfolane; ether group-containing monools such as propylene glycol monomethyl ether, propylene glycol monoethyl ether, diethylene glycol monomethyl ether, diethylene glycol monoethyl ether and 2-ethoxyethanol; and diols such as 1,3-butane diol, 1,4-butane diol, 1,5-pentane diol and 1,6-hexane diol. Of these, cyclic esters, cyclic carbonates, cyclic sulfones and ether group-containing monools are desired, γ-butyrolactone, propylene carbonate, sulfolane and ether group-containing monools are more desired, and γ-butyrolactone and sulfolane are further desired. The solubility parameter (Hildebrand SP value) δ of the poor solvent is desirably at least 1.6 $MPa^{1/2}$ higher than the solubility parameter δ of the EVOH.

It should be noted that in the case of EVOH, water and alcohols are poor solvents for EVOH, but a mixed solvent of water and an alcohol (particularly, propyl alcohol) is a good solvent. Here, the mixed solvent of water and an alcohol can be regarded as a mixed solvent of: a mixed solvent of water and an alcohol, which is a good solvent having a reduced amount of water; and water which is a poor solvent having a higher boiling point than the mixed solvent, and it is therefore possible to use only a mixed solvent of water and an alcohol in the preparation of an EVOH solution. Therefore, in the present disclosure, in cases where a solvent obtained by mixing two or more types of poor solvent for a specific water-insoluble polymer becomes a good solvent, it is possible to use singularly this mixed solvent including two or more types of poor solvent as the mixed solvent containing a good solvent for the water-insoluble polymer and a poor solvent for the water-insoluble polymer in order to prepare a solution.

2. Case Where Water-insoluble Polymer is Cellulose Acetate

Examples of suitable good solvents for cellulose acetate include nitrogen-containing polar solvents (particularly, nitrogen-containing aprotic polar solvents) such as N,N-dimethylformamide, N,N-dimethylacetamide and N-methylpyrrolidone; esters such as methyl formate and methyl acetate; ketones such as acetone and cyclohexanone; cyclic ethers such as tetrahydrofuran, dioxane and dioxolane; glycol derivatives such as methyl glycol and methyl glycol acetate; halogenated hydrocarbons such as methylene chloride, chloroform and tetrachloroethane; cyclic carbonates such as propylene carbonate; and sulfur-containing polar solvents (particularly, sulfur-containing aprotic polar solvents) such as DMSO. Of these, a sulfur-containing aprotic polar solvent is desired, and DMSO is more desired.

Examples of suitable poor solvents for cellulose acetate include alcohols such as 1-hexanol, 1,3-butane diol, 1,4-butane diol, 1,5-pentane diol and 1,6-hexane diol. A monohydric or dihydric alcohol having 4 to 6 carbon atoms is desired as the alcohol.

3. Case Where Water-insoluble Polymer is Poly(Vinylidene Fluoride)

Examples of suitable good solvents for poly(vinylidene fluoride) include nitrogen-containing polar solvents (particularly, nitrogen-containing aprotic polar solvents) such as N,N-dimethylformamide, N,N-dimethylacetamide and N-methylpyrrolidone; and sulfur-containing polar solvents (particularly, sulfur-containing aprotic polar solvents) such as DMSO. Of these, a nitrogen-containing aprotic polar solvent is desired, and N,N-dimethylformamide is more desired.

Examples of suitable poor solvents for poly(vinylidene fluoride) include alcohols such as 1-hexanol, 1,3-butane diol, 1,4-butane diol, 1,5-pentane diol, 1,6-hexane diol and glycerin; and cyclic ethers such as tetrahydrofuran, dioxane and dioxolane. A dihydric or trihydric alcohol having 3 to 6 carbon atoms is desired as the alcohol.

The usage quantities of the water-insoluble polymer, the good solvent and the poor solvent may be selected, as appropriate, according to the types thereof being used. The mixing amount of the water-insoluble polymer is desirably 1 part by mass or more, more desirably 5 parts by mass or more, and further desirably 10 parts by mass or more, relative to 100 parts by mass of the good solvent. On the other hand, the mixing amount of the water-insoluble polymer is desirably 40 parts by mass or less, more desirably 35 parts by mass or less, and further desirably 30 parts by mass or less, relative to 100 parts by mass of the good solvent. The mixing amount of the poor solvent is desirably 10 parts by mass or more, more desirably 20 parts by mass or more, and further desirably 30 parts by mass or more, relative to 100 parts by mass of the good solvent. On the other hand, the mixing amount of the poor solvent is desirably 400 parts by mass or less, more desirably 200 parts by mass or less, and further desirably 100 parts by mass or less, relative to 100 parts by mass of the good solvent. By altering these amounts, it is possible to control the state of pores (for example, porosity, pore diameter, and the like) in an obtained porous body.

In addition to the water-insoluble polymer and the mixed solvent, the solution of the water-insoluble polymer may further contain other components as long as the advantageous effect of the present disclosure is not significantly impaired.

The method for preparing the solution of the water-insoluble polymer is not particularly limited. It is possible to dissolve a water-insoluble polymer in a good solvent, then add a poor solvent and then mix until a homogeneous solution is obtained, or add a water-insoluble polymer to a mixed solvent of a good solvent and a poor solvent and dissolve the water-insoluble polymer in the mixed solvent. The solution can be prepared using a publicly known stirring device, mixing device, or the like. When preparing the solution of the water-insoluble polymer, it is possible to irradiate with ultrasonic waves, carry out heating, or the like. The heating temperature is, for example, not less than 40° C. but not more than 100° C. Is possible to prepare the solution of the water-insoluble polymer by heating, and then cool the solution in such a way that the good solvent and the poor solvent do not separate. In addition, this cooling is desirably carried out so that the water-insoluble polymer does not precipitate. This is because precipitated water-insoluble polymer can be an impurity.

Next, an explanation will now be given of the solution coating step. The substrate used in the solution coating step is not particularly limited as long as this can function as a substrate. A substrate that is resistant to the solvents contained in the solution is typically used as the substrate.

The substrate may be one that is eventually detached from the porous body for use of the porous body, or one that is not detached from the porous body during use of the porous body. The shape of the substrate is not particularly limited, but a substrate having a flat surface is desired. Examples of shapes include sheet-shaped, film-shaped, foil-shaped and plate-shaped. Examples of constituent materials of the substrate include resins, glasses and metals.

Examples of the resins include poly(ethylene terephthalate) (PET), poly(ethylene naphthalate) (PEN), polyethylene (PE), polypropylene (PP), polystyrene, poly(vinyl chloride), poly(meth)acrylates, polycarbonates, polyimides, polyamides and polyamideimides.

Examples of the metals include aluminum, copper, nickel and stainless steel. In addition, a material obtained by using a plurality of materials, such as a fiber-reinforced resin such as a glass fiber-reinforced epoxy resin, can be used as the substrate.

In addition, the substrate may have a multilayer structure. For example, the substrate may have a release layer that contains a fluororesin. For example, the substrate may be a paper or the like having a resin layer.

In cases where the porous body is used without detaching the substrate, the substrate may function as a functional layer of the porous body. For example, the substrate may function as a reinforcing material, a supporting material, or the like. In addition, the substrate may be an active material layer of an electrode of a secondary battery, or the like.

The coating method is not particularly limited, and may be selected, as appropriate, according to the type of substrate. Examples of coating methods include die coating methods, gravure coating methods, roll coating methods, spin coating methods, dip coating methods, bar coating methods, blade coating methods, spray coating methods and casting methods. The coating thickness is not particularly limited and may be set, as appropriate, according to the intended use of the porous body, and is, for example, not less than 1 µm but not more than 500 µm, and desirably not less than 10 µm but not more than 300 µm.

By carrying out the solution coating step, a coating film of the solution is formed on the substrate. It should be noted that in order to adjust the viscosity of the coating film of the solution, pre-drying may be carried out in such a way that the good solvent and poor solvent of the solution remain.

Next, an explanation will now be given of the slurry coating step. In the slurry coating step, a slurry containing insulating particles, a binder and a dispersion medium is first prepared.

Inorganic particles, organic particles and organic-inorganic composite particles can be used as the insulating particles. Examples of organic materials that constitute the organic particles include polyolefins, (meth)acrylic resins, polystyrene, polyimides, phenol resins and melamine resins. Examples of the inorganic material that constitutes the inorganic particles include inorganic oxides such as alumina ($Al_2O_3$), magnesia (MgO), silica ($SiO_2$) and titania ($TiO_2$); nitrides such as aluminum nitride and silicon nitride; metal hydroxides such as calcium hydroxide, magnesium hydroxide and aluminum hydroxide; clay minerals such as mica, talc, boehmite, zeolites, apatite and kaolin; and glass fibers. Of these, alumina and boehmite are desired. Examples of organic-inorganic composite particles include particles obtained by coating the above-mentioned inorganic particles with the above-mentioned organic material.

The shape of the insulating particles is not particularly limited, and may be spherical, plate-shaped, amorphous or the like. The average particle diameter of the insulating particles is not particularly limited. From the perspective of dispersion stability, the average particle diameter of the insulating particles is desirably 5 µm or less, more desirably 2.5 µm or less, and further desirably 1.7 µm or less. The lower limit is not particularly limited, but from perspectives such as handleability, is desirably 0.05 µm or more, more desirably 0.2 µm or more, and further desirably 0.53 µm or more. It should be noted that the average particle diameter can be determined by measuring the particle size distribution using, for example, a laser diffraction/scattering method and then determining the particle diameter corresponding to a cumulative frequency of 50% in terms of vol % in the particle size distribution (also referred to as the median diameter or median particle diameter).

The BET specific surface area of the insulating particles is not particularly limited, but is, for example, not less than 1 $m^2/g$ but not more than 100 $m^2/g$, desirably not less than 1.5 $m^2/g$ but not more than 50 $m^2/g$, and more desirably not less than 2 $m^2/g$ but not more than 10 $m^2/g$. For example, the BET specific surface area can be measured using an inert gas such as nitrogen gas on the basis of the BET method.

Examples of the binder include acrylic-based binders; rubber-based binders such as butadiene rubbers (BR) and styrene-butadiene rubbers (SBR); polyolefin-based binders; and fluororesin-based binders such as poly(vinylidene fluoride) (PVDF) and polytetrafluoroethylene (PTFE). In addition, the water-insoluble polymer used in the solution preparation step can be used as the binder contained in the slurry in cases where the function of a binder is to be exhibited.

Regarding a dispersion medium, a medium is used that does not dissolve the insulating particles so as to function as the dispersion medium. In addition, a medium able to dissolve the water-insoluble polymer is used as the dispersion medium. In cases where the dispersion medium does not dissolve the water-insoluble polymer, precipitation of the water-insoluble polymer occurs at an interface between the coating film of the solution of the water-insoluble polymer and the coating film of the slurry, thereby causing a skin layer to be formed. The solubility of the water-insoluble polymer in the dispersion medium at 25° C. is desirably 0.5 mass % or more, more desirably 1 mass % or more, further desirably 2.5 mass % or more, and most desirably 5 mass % or more. The dispersion medium may, or may not, dissolve the binder, but desirably dissolves the binder.

As the composition of the dispersion medium becomes similar to the composition of the mixed solvent of a good solvent and poor solvent used in the solution preparation step, it becomes easier to form a uniform coating film of the slurry on the coating film of the water-insoluble polymer solution. Accordingly, the dispersion medium desirably contains a good solvent and a poor solvent for the water-insoluble polymer being used, and more desirably contains the good solvent and poor solvent used in the solution preparation step (that is, the good solvent and poor solvent contained in the prepared solution of the water-insoluble polymer). Here, the volume ratio of the mixed solvent of a good solvent and a poor solvent is desirably the same as the volume ratio of the good solvent and the poor solvent in the solution preparation step. That is, it is most desirable for the composition of the dispersion medium in the slurry to be the same as the composition of the solvent contained in the solution mentioned above.

In addition to the insulating particles, the binder and the dispersion medium, the slurry may contain optional components (for example, a thickening agent).

The solid content concentration in the slurry is not particularly limited, but is desirably not less than 10 mass % but not more than 85 mass %, and more desirably not less than 20 mass % but not more than 60 mass %.

The content ratio of the insulating particles in the total solid content of the slurry is not particularly limited, but is desirably 70 mass % or more, and more desirably 80 mass % or more. The content ratio of the binder in the total solid content of the slurry is not particularly limited, but is desirably not less than 0.5 mass % but not more than 25 mass %, and more desirably not less than 1 mass % but not more than 20 mass %.

The slurry can be prepared using a publicly known method. For example, the slurry can be prepared by mixing and dispersing the components of the slurry in a publicly known mixing apparatus or dispersing apparatus (for example, a homogenizer, a homodisper, a planetary mixer, an ultrasonic disperser, a pigment disperser or a ball mill).

By carrying out the solution coating step, a coating film of the solution is formed on the substrate. In the slurry coating step, the prepared slurry is coated on the formed coating film of the solution. That is, the slurry is coated on the coating film of the solution using a wet-on-wet method. The slurry can be coated in accordance with a publicly known method. Examples of coating methods include die coating methods, gravure coating methods, roll coating methods, spin coating methods, dip coating methods, bar coating methods, blade coating methods and casting methods. The coating thickness is not particularly limited and may be set, as appropriate, according to the intended use of the porous body, and is, for example, not less than 1 μm but not more than 500 μm, desirably not less than 1 μm but not more than 300 μm, and more desirably not less than 1 μm but not more than 50 μm.

An explanation will now be given of the simultaneous drying step. In the simultaneous drying step, the good solvent and poor solvent in the coating film of the solution are removed through vaporization (particularly, volatilization), and the dispersion medium of the slurry is also removed through vaporization (particularly, volatilization). At this time, pores are formed by this operation, and by the poor solvent in particular, and a porous body of the water-insoluble polymer is obtained. Typically, pores are formed in the coating film of the solution by, for example, phase separation between the water-insoluble polymer and the mixed solvent in which the poor solvent has become highly concentrated. Specifically, because the poor solvent has a higher boiling point than the good solvent, the good solvent is preferentially vaporized ahead of the poor solvent in this step. As the amount of good solvent decreases, the concentration of the poor solvent in the mixed solvent increases. Because the solubility of the water-insoluble polymer in the poor solvent is lower than in the good solvent, phase separation occurs between the water-insoluble polymer and the mixed solvent in which the poor solvent has become highly concentrated, and a porous skeleton of the water-insoluble polymer is formed. This phase separation may be spinodal decomposition. Finally, the good solvent is removed, the water-insoluble polymer is precipitated, the poor solvent with the high boiling point is removed through vaporization, and pores are produced. A porous body of the water-insoluble polymer is produced in this way. It should be noted that in order to cause phase separation between the water-insoluble polymer and the mixed solvent in which the poor solvent has become highly concentrated, the type and usage quantity of the good solvent and the type and usage quantity of the poor solvent may be appropriately selected.

In cases where a coating film of the slurry is not present on the coating film of the solution of the water-insoluble polymer, the surface of the coating film of the solution of the water-insoluble polymer is exposed, and this surface becomes a dry interface. As a result, the rate of vaporization is greater at the surface of the coating film of the solution of the water-insoluble polymer than in the inner part of the coating film, which leads to differences in terms of composition between the surface and the inner part of the coating film of the solution. As a result, the surface of the coating film is not porosified, and a skin layer is formed. However, in the present disclosure, a wet-on-wet coating method is used and the coating film of the slurry is present on the coating film of the solution of the water-insoluble polymer. In addition, these coating films are simultaneously dried. Therefore, because the surface of the coating film of the solution of the water-insoluble polymer is not a dry interface, differences in terms of composition between the surface and the inner part of the coating film of the solution are suppressed, which results in that the surface of the coating film of the solution is porosified and formation of a skin layer is suppressed.

The drying can be carried out in accordance with a publicly known method. Examples of the drying method include methods involving heating, methods involving leaving in a vacuum, methods involving heating under reduced pressure and methods involving air drying. These methods can be carried out in the same way as publicly known drying methods. From the perspective of ease of carrying out the procedure, a method involving heating is desired. The heating temperature is not particularly limited, but is desirably a temperature at which the mixed solvent and the dispersion medium do not boil and the water-insoluble polymer does not decompose. Specifically, the heating temperature is, for example, 25° C. or higher, desirably 50° C. or higher, and more desirably 70° C. or higher. On the other hand, the heating temperature is, for example, 180° C. or lower, desirably 150° C. or lower, and more desirably 125° C. or lower. The heating time may be decided, as appropriate, according to the type of solvent and the heating temperature. While vaporizing the good solvent, the poor solvent and the dispersion medium, it is desirable to leave the substrate having the coating film of the solution and the coating film of the slurry to stand.

A porous body of the water-insoluble polymer can be obtained in the manner described above. The obtained water-insoluble polymer has a layer of the water-insoluble polymer and a layer of the insulating particles. Here, because voids are present between insulating particles, the layer of the insulating particles is a porous layer. Therefore, the obtained porous body has a porous layer of the water-insoluble polymer and a porous layer of the insulating particles. In the present disclosure, the porous layer of the insulating particles can be constituted as a functional layer such as a reinforcing layer or a heat-resistant layer.

The porous layer of the water-insoluble polymer can have a three-dimensional network-shaped porous structure in which pores are connected from one principal surface of the thin film-shaped porous body to the other principal surface. According to the production method of the present disclosure, the average pore diameter in the porous layer of the water-insoluble layer can be, for example, 0.5 μm or more (particularly, 0.9 μm or more or even 1.4 μm or more) and 5 μm or less (particularly, 4.2 μm or less or even 3.8 μm or less). It should be noted that the average pore diameter can be determined by taking an electron microscope photograph of a cross section of the porous layer and determining the average pore diameter as the average value of the diameters of 100 or more pores. In cases where the cross section of a pore is aspherical, the average value of the maximum diameter and minimum diameter of the pore may be taken to be the pore diameter. According to the production method of the present disclosure, the porosity of the porous layer of the water-insoluble polymer can be, for example, 15% or more (particularly, 42% or more, 51.5% or more, or even 61.5% or more) and less than 80% (particularly, less than 75%). It should be noted that the porosity can be calculated in accordance with a publicly known method using the true density and the apparent density.

According to the present disclosure, it is possible to produce a porous body of a water-insoluble polymer by the simple procedure of preparing a solution of a water-insoluble polymer and a slurry, coating these and then drying. In the present disclosure, it is not necessary to carry out a cooling procedure so as to precipitate a molded body or a procedure of replacing a solvent, which was necessary in the prior art. Therefore, the method of producing a porous body of a water-insoluble polymer of the present disclosure is excellent in terms of simplicity. In addition, formation of a skin layer is suppressed in the porous body of the water-insoluble polymer. Therefore, the porous body of the water-insoluble polymer can be used in a wide variety of applications.

Examples of applications of the porous body of a water-insoluble polymer include packing materials, construction materials, sound-absorbing materials, cleaning articles, cosmetic products, separation membranes, adsorbent materials, carriers for purification, catalyst carriers and culture carriers. In addition, by making use of a nature that an electrolyte solution can infiltrate into the porous body because there is no skin layer, the porous body of the water-insoluble polymer can be used as a separator for a secondary battery. In cases where the porous body is used as a separator, the layer of insulating particles has the advantage of being able to function as a heat-resistant layer (HRL). In addition, because the separator can be directly formed on an active material layer, this is advantageous in terms of separator production.

Therefore, the production method described above can be applied as a method of producing an electrode-integrated separator of a secondary battery, the method including the steps of: preparing a solution in which a water-insoluble polymer is dissolved in a mixed solvent containing a good solvent for the water-insoluble polymer and a poor solvent for the water-insoluble polymer; coating the solution on an active material layer of an electrode; coating a slurry containing insulating particles, a binder and a dispersion medium on the coated solution; and simultaneously drying the coated solution and the coated slurry to porosify the water-insoluble polymer, in which the boiling point of the poor solvent is higher than the boiling point of the good solvent, and the dispersion medium can dissolve the water-insoluble polymer.

In cases where the electrode is a positive electrode, an active material layer (that is, a positive electrode active material layer) can contain a positive electrode active material. Lithium-transition metal oxides (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, and the like) and lithium-transition metal phosphate compounds (for example, $LiFePO_4$ and the like) can be given as examples of the positive electrode active material. The positive electrode active material layer can contain components other than the active material, such as an electrically conductive material, a binder and lithium phosphate. Carbon black such as acetylene black (AB) and other carbon materials (for example, graphite or the like) can be advantageously used as an electrically conductive material. For example, poly(vinylidene fluoride) (PVDF) or the like can be used as a binder.

In cases where the electrode is a negative electrode, an active material layer (that is, a negative electrode active material layer) can contain a negative electrode active material. Carbon materials such as graphite, hard carbon and soft carbon can be given as examples of the negative electrode active material. The negative electrode active material layer can contain components other than the active material, such as a binder or a thickening agent. For example, a styrene-butadiene rubber (SBR) or the like can be used as a binder. For example, carboxymethyl cellulose (CMC) or the like can be used as a thickening agent.

The active material layer is typically formed on a current collector. Examples of the current collector include an aluminum foil and a copper foil.

This method of producing an electrode-integrated separator of a secondary battery is particularly excellent in terms of being able to produce an electrode-integrated separator of a secondary battery, which is provided with a heat-resistant layer, in an extremely simple manner.

EXAMPLES

Explanations will now be given of examples relating to the present disclosure, but it is not intended that the present disclosure is limited to these examples.

Example 1

Into a sample bottle, 1 g of an ethylene-vinyl alcohol copolymer ("Eval L171B" available from Kuraray Co., Ltd.; ethylene content 27 mol %, hereinafter abbreviated to "EVOH") was weighed out. To this was added 5 mL of a mixed solvent containing water and n-propyl alcohol (nPA) at a volume ratio of 7:3 as a good solvent, and 2.1 mL of γ-butyrolactone (GBL) as a poor solvent. The sample bottle was heated to 80° C. to 90° C. and stirred until the EVOH completely dissolved in these solvents, thereby obtaining a solution of EVOH. The solution of EVOH was then cooled to 25° C. The solution of EVOH was then coated on an aluminum sheet as a substrate by casting. At this time, the coating thickness was 100 μm.

Next, a slurry was obtained by adding 5 mL of a mixed solvent containing water and nPA at a volume ratio of 7:3 and 2.1 mL of GBL as dispersion media, 1 g of EVOH as a binder and 5 g of boehmite ("BMM-W" available from Kawai Lime Industry Co., Ltd.; median particle diameter=1.7 μm, BET specific surface area=3.9 m²/g) to a container and stirring these for 20 minutes at a rotational speed of 1000 rpm using a homodisper high speed disperser. The obtained slurry was coated by casting on the coating film of the EVOH solution. The coating thickness was 50 μm.

This was then placed in a drier set to 120° C. and heated, thereby removing the good solvent, the poor solvent and the dispersion medium by vaporization. A thin film was obtained on the aluminum sheet in this way. A cross section of the obtained thin film was observed using a scanning electron microscope (SEM), and thereby it could be confirmed that the thin film was a porous body having a porous EVOH layer and a boehmite layer in voids between particles. In addition, it could be confirmed that there was no skin layer. Furthermore, in the undermentioned liquid infiltration evaluation also, it could be confirmed that there was no skin layer and that the thin film was a porous body. For reference purposes, a SEM photograph of a cross section of the thin film obtained in Example 1 is shown in FIG. 1. It should be noted that in the SEM photograph, the layer on the lower side is the EVOH layer and the layer on the upper side is the boehmite layer.

Example 2

A slurry was obtained by adding 6 mL of a mixed solvent containing water and nPA at a volume ratio of 7:3 and 1.0 mL of GBL as dispersion media, 1 g of EVOH as a binder and 5 g of boehmite to a container and stirring these for 20 minutes at a rotational speed of 1000 rpm using a homodisper high speed disperser.

Figure 2:
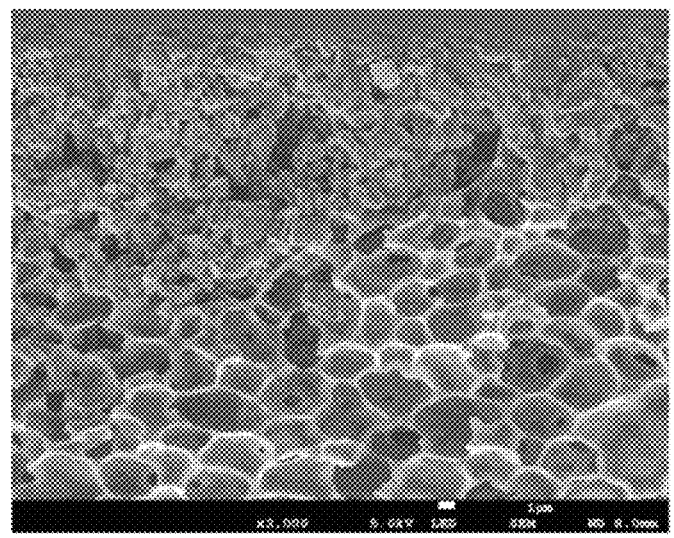
FIG. 2 is a SEM photograph of a cross section of a thin film obtained in Example 2.

A thin film was formed on an aluminum plate in the same way as in Example 1, using this slurry and the EVOH solution produced in Example 1. A cross section of the obtained thin film was observed using a SEM, and thereby it could be confirmed that the thin film was a porous body having a porous EVOH layer and a boehmite layer in voids between particles. In addition, it could be confirmed that there was no skin layer. Furthermore, in the undermentioned liquid infiltration evaluation also, it could be confirmed that there was no skin layer and that the thin film was a porous body. For reference purposes, a SEM photograph of a cross section of the thin film obtained in Example 2 is shown in FIG. 2.

Example 3

A slurry was obtained by adding 5 mL of a mixed solvent containing water and nPA at a volume ratio of 7:3 as a dispersion medium, 0.5 g of EVOH as a binder and 2.5 g of boehmite to a container and stirring these for 20 minutes at a rotational speed of 1000 rpm using a homodisper high speed disperser.

Figure 3:
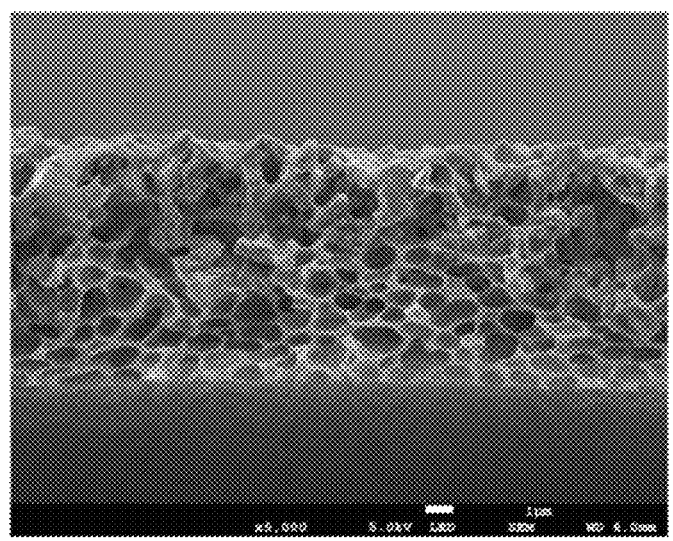
FIG. 3 is a SEM photograph of a cross section of a thin film obtained in Example 3.

A thin film was formed on an aluminum plate in the same way as in Example 1, using this slurry and the EVOH solution produced in Example 1. A cross section of the obtained thin film was observed using a SEM, and thereby it could be confirmed that the thin film was a porous body having a porous EVOH layer and a boehmite layer in voids between particles. In addition, it could be confirmed that there was no skin layer. Furthermore, in the undermentioned liquid infiltration evaluation also, it could be confirmed that there was no skin layer and that the thin film was a porous body. For reference purposes, a SEM photograph of a cross section of the thin film obtained in Example 3 is shown in FIG. 3. It should be noted that in the present example, in which the dispersion medium of the slurry did not contain GBL, the slurry coating film became uneven when the slurry was coated.

Example 4

A slurry was obtained by adding 5 mL of a mixed solvent containing water and nPA at a volume ratio of 7:3 and 3 mL of GBL as dispersion media, 1 g of EVOH as a binder and 5 g of boehmite to a container and stirring these for 20 minutes at a rotational speed of 1000 rpm using a homodisper high speed disperser.

Figure 4:
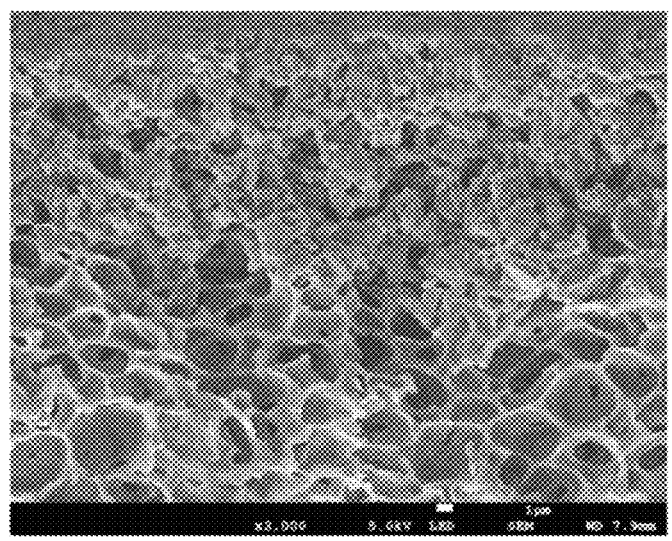
FIG. 4 is a SEM photograph of a cross section of a thin film obtained in Example 4.

A thin film was formed on an aluminum plate in the same way as in Example 1, using this slurry and the EVOH solution produced in Example 1. A cross section of the obtained thin film was observed using a SEM, and thereby it could be confirmed that the thin film was a porous body having a porous EVOH layer and a boehmite layer in voids between particles. In addition, it could be confirmed that there was no skin layer. Furthermore, in the undermentioned liquid infiltration evaluation also, it could be confirmed that there was no skin layer and that the thin film was a porous body. For reference purposes, a SEM photograph of a cross section of the thin film obtained in Example 4 is shown in FIG. 4.

Comparative Example 1

The EVOH solution produced in Example 1 was then coated on an aluminum sheet as a substrate by casting.

Figure 5:
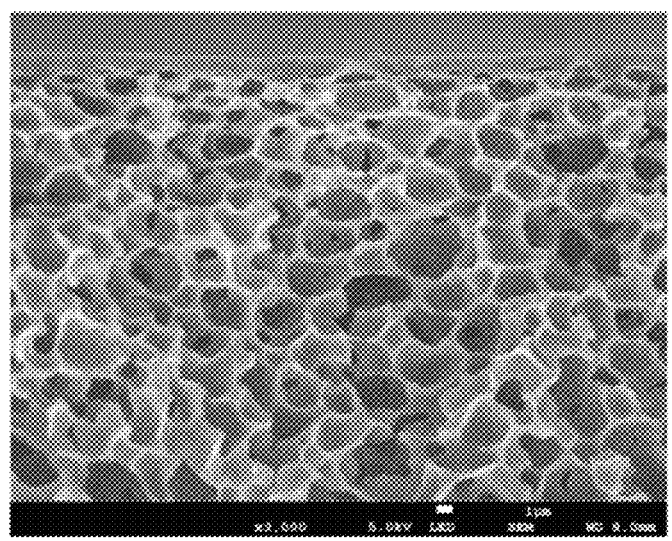
FIG. 5 is a SEM photograph of a cross section of a thin film obtained in Comparative Example 1.

This was then placed in a drier set to 120° C. and heated, thereby removing the good solvent and the poor solvent by vaporization. A thin film was obtained on the aluminum sheet in this way. A cross section of the obtained thin film was observed using a SEM, and thereby it could be confirmed that the thin film was a porous body formed of a single porous EVOH layer. However, it was confirmed that the surface of the porous body was not open and that a skin layer was formed. Furthermore, in the undermentioned liquid infiltration evaluation also, it was confirmed that the organic solvent did not infiltrate the thin film and that a skin layer was formed. For reference purposes, a SEM photograph of a cross section of the thin film obtained in Comparative Example 1 is shown in FIG. 5.

Comparative Example 2

A slurry was obtained by adding 99 g of water as a dispersion medium, 1 g of carboxymethyl cellulose (CMC) as a binder and 5 g of boehmite to a container and stirring these for 20 minutes at a rotational speed of 1000 rpm using a homodisper high speed disperser.

Figure 6:
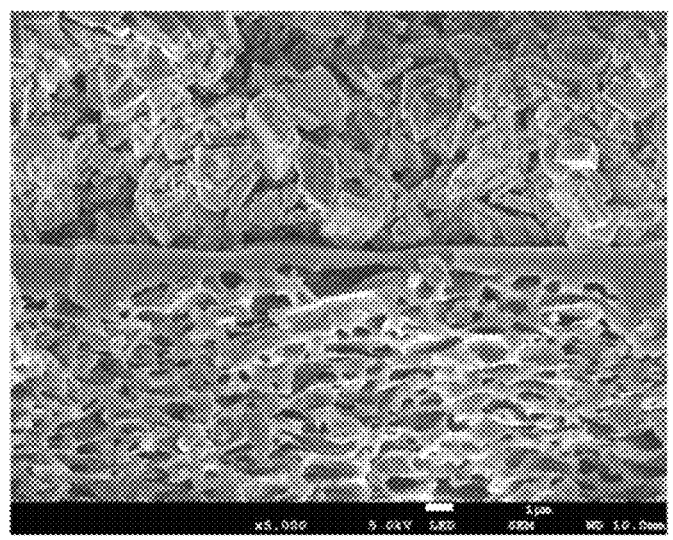
FIG. 6 is a SEM photograph of a cross section of a thin film obtained in Comparative Example 2.

A thin film was formed on an aluminum plate in the same way as in Example 1, using this slurry and the EVOH solution produced in Example 1. A cross section of the obtained thin film was observed using a SEM, and thereby it could be confirmed that the thin film was a porous body having a porous EVOH layer and a boehmite layer in voids between particles. However, it was confirmed that a skin layer was formed at the boundary of the EVOH layer and the boehmite layer. In the undermentioned liquid infiltration evaluation also, it was confirmed that the organic solvent did not infiltrate the thin film and that a skin layer was formed. For reference purposes, a SEM photograph of a cross section of the thin film obtained in Comparative Example 2 is shown in FIG. 6.

Example 5

A thin film was formed on an aluminum plate in the same way as in Example 1, except that the amount of boehmite in the slurry was changed from 5 g to 30 g. The obtained thin film was subjected to the undermentioned liquid infiltration evaluation, and thereby it could be confirmed that the thin film had no skin layer and was a porous body.

Example 6

A thin film was formed on an aluminum plate in the same way as in Example 1, except that the 5 g of boehmite in the slurry was replaced by 5 g of alumina (high purity alumina "AKP-3000" available from Sumitomo Chemical Co., Ltd., median particle diameter=0.53 µm, BET specific surface area=4.5 m$^2$/g). The obtained thin film was subjected to the undermentioned liquid infiltration evaluation, and thereby it could be confirmed that the thin film had no skin layer and was a porous body.

Liquid Infiltration Evaluation

An organic solvent (ethanol or propylene carbonate) was added dropwise to the surface of a thin film, and the state of penetration was evaluated visually. In cases where the organic solvent infiltrated as far as the back surface of the thin film, it could be assessed that there was no skin layer and that the thin film was porosified. However, in cases where the organic solvent did not infiltrate, it could be assessed that a skin layer was formed.

From the results above, it is understood that according to the present disclosure, it is possible to produce a porous body of a water-insoluble polymer in a simple manner while suppressing formation of a skin layer.

What is claimed is:

1. A method of producing a porous body of a water-insoluble polymer, the method comprising the steps of:

preparing a solution in which a water-insoluble polymer is dissolved in a mixed solvent containing a good solvent for the water-insoluble polymer and a poor solvent for the water-insoluble polymer;

coating the solution on a substrate;

coating a slurry containing insulating particles, a binder and a dispersion medium on the coated solution; and simultaneously drying the coated solution and the slurry to porosify the water-insoluble polymer, wherein the poor solvent has a boiling point higher than a boiling point of the good solvent, and the dispersion medium is capable of dissolving the water-insoluble polymer.

2. The production method according to claim 1, wherein the dispersion medium of the slurry contains the good solvent and the poor solvent contained in the solution.

* * * * *